(12) United States Patent
Wang

(10) Patent No.: US 10,452,179 B2
(45) Date of Patent: Oct. 22, 2019

(54) TOUCH SUBSTRATE AND TOUCH DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventor: Benlian Wang, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 0 days.

(21) Appl. No.: 15/688,111

(22) Filed: Aug. 28, 2017

(65) Prior Publication Data

US 2018/0196558 A1   Jul. 12, 2018

(30) Foreign Application Priority Data

Jan. 9, 2017   (CN) .......................... 2017 1 0013485

(51) Int. Cl.
*G06F 3/041* (2006.01)
*G02F 1/1343* (2006.01)
*G02F 1/1333* (2006.01)
*G06F 3/044* (2006.01)

(52) U.S. Cl.
CPC .......... *G06F 3/0412* (2013.01); *G02F 1/1343* (2013.01); *G02F 1/13338* (2013.01); *G06F 3/044* (2013.01); *G06F 2203/04112* (2013.01)

(58) Field of Classification Search
CPC .......... G06F 3/045; G06F 3/041; G06K 11/06
See application file for complete search history.

(56) References Cited

U.S. PATENT DOCUMENTS

| 2005/0083307 | A1 | 4/2005 | Aufderheide et al. |
| 2007/0236618 | A1 | 10/2007 | Maag et al. |
| 2012/0105365 | A1 | 5/2012 | Lin |
| 2012/0169650 | A1* | 7/2012 | Chang .................. G06F 3/0418 345/174 |

(Continued)

FOREIGN PATENT DOCUMENTS

| CN | 1867882 A | 11/2006 |
| CN | 101410778 B | 12/2012 |

(Continued)

OTHER PUBLICATIONS

First Office Action for Chinese Application No. 201710013485.1, dated Apr. 1, 2019, 7 pages.

*Primary Examiner* — Pegeman Karimi
(74) *Attorney, Agent, or Firm* — Brooks Kushman P.C.

(57) ABSTRACT

A touch substrate and a touch display device are provided. The touch substrate and the touch display device relate to the field of display technology, and aim to solve the problem that in the touch substrate regions covered with electrode patterns reflect light and regions not covered with electrode patterns do not reflect light, thus causing a visual difference and resulting in a degraded display effect. The touch substrate includes a plurality of electrodes, and at least one of the plurality of electrodes has a hollowed-out structure.

14 Claims, 4 Drawing Sheets

(56) References Cited

U.S. PATENT DOCUMENTS

| | | | | |
|---|---|---|---|---|
| 2013/0201348 A1* | 8/2013 | Li | .......................... | G06F 3/044 |
| | | | | 348/174 |
| 2015/0077650 A1* | 3/2015 | Huang | .................... | G06F 3/044 |
| | | | | 349/12 |
| 2015/0220179 A1* | 8/2015 | Kimura | ................... | G06F 3/044 |
| | | | | 345/174 |
| 2016/0195983 A1* | 7/2016 | Miyake | ................ | G06F 3/0416 |
| | | | | 345/174 |

FOREIGN PATENT DOCUMENTS

| | | |
|---|---|---|
| CN | 203480458 U | 3/2014 |
| CN | 205353970 U | 6/2016 |
| CN | 105892781 A | 8/2016 |

* cited by examiner

TOUCH SUBSTRATE AND TOUCH DISPLAY DEVICE

CROSS-REFERENCE TO RELATED APPLICATIONS

This application claims priority to Chinese Patent Application No. 201710013485.1 filed on Jan. 9, 2017, which is incorporated herein by reference in its entirety.

TECHNICAL FIELD

The present disclosure relates to the field of display technology, and more particularly to a touch substrate and a touch display device.

BACKGROUND

As an intuitive and simple input device of a computer and other data processing equipment, touch substrates are widely used in various mobile devices. Currently, there are numerous types of touch substrate, such as a resistance-type, a capacitance-type, an optical-type that are capable of detecting a position of a single-point touch or multi-point touch.

The touch substrates implement sensing of touch positions mainly by electrode patterns formed on base substrates. Electrode patterns are generally prepared using indium tin oxide (ITO) which is a transparent conducting material. However, since the transparency of ITO is not 100%, in a light environment, regions covered with electrode patterns reflect external light, while regions not covered with electrode patterns will not reflect external light, such a difference will result in a user's visual perception of apparent electrode patterns, which adversely affects the display effect.

SUMMARY

The present disclosure provides in at least one embodiment a touch substrate and a touch display device to solve the problem that in the touch substrate regions covered with electrode patterns reflect light while regions not covered with electrode patterns do not reflect light, thus causing a visual difference and resulting in a degraded display effect.

In order to achieve the above object, embodiments of the present disclosure adopt the following technical solutions.

In a first aspect, the present disclosure provides in at least one embodiment a touch substrate, which includes a plurality of electrodes. At least one of the plurality of electrodes has a hollowed-out structure.

In embodiments of the present disclosure, at least one of the electrodes of the touch substrate is configured to have a hollowed-out structure, regions to which hollowed-out portions of the electrode correspond are not covered by a transparent conducting material, therefore light would not be reflected therefrom. That is, reflecting regions in one electrode have non-reflecting regions. However, in the related art, the region to which one electrode corresponds is completely covered with a transparent conducting material capable of reflecting light, that is, the entire region to which one electrode corresponds reflects light. Compared with the related art, according to the present disclosure, the reflecting region of one electrode has non-reflecting regions, therefore a degree of visual difference caused by regions covered with the electrode patterns reflecting light and regions not covered with the electrode patterns not reflecting light is decreased, therefore the user would not visually perceive an apparent electrode pattern, thus improving the display effect and improving user's experience.

In a second aspect, the present disclosure provides in at least one embodiment a touch display device, including the touch substrate according to the first aspect.

Beneficial effects of the touch display device provided by the present disclosure in at least one embodiment are identical to those of the touch substrate according to the first aspect, which will not be repeated herein.

BRIEF DESCRIPTION OF THE DRAWINGS

In order to illustrate technical solutions according to embodiments of the present disclosure or in the related art more clearly, drawings for the description of the related art or the embodiments will be described briefly hereinafter. Apparently, the drawings described hereinafter are related to merely a portion of the embodiments of the present disclosure, and other drawings may be obtained by those skilled in the art based on those drawings without creative work.

Figure 1:
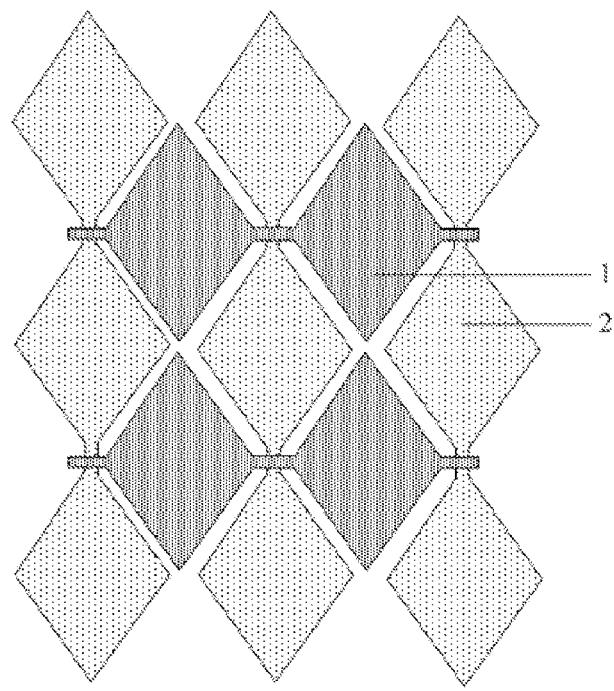
FIG. 1 is a structure diagram of a touch functional layer of a touch substrate in the related art.

| Reference Numerals: |
| --- |
| 1—driving electrode block; |
| 2—sensing electrode block; |
| 3—electrode; |
| 31—non-hollowed-out portion; |
| 311—body portion; |
| 312—connecting portion; |
| 32—hollowed-out portion; |
| 4—gap. |

DETAILED DESCRIPTION

In order to make the objects, the features and the advantages of the present disclosure more apparent, embodiments of the technical solutions provided by the present disclosure will be described hereinafter in a clear and complete manner in conjunction with the drawings. Apparently, the following embodiments are merely a part of, rather than all of, the embodiments of the present disclosure, and based on these embodiments, a person skilled in the art may obtain other embodiments, which also fall within the scope of the present disclosure.

As shown in FIG. 1, the electrode pattern of a common touch substrate in the related art includes a plurality of rows of driving electrode blocks 1 and a plurality of columns of sensing electrode blocks 2. The driving electrode blocks 1 sequentially connected in each row form a driving line. The sensing electrode blocks 2 sequentially connected in each column form a sensing line. The driving line and the sensing line are electrically isolated at the overlap using an insulating layer. By inputting a driving signal to the driving electrode blocks 1 in each row and acquiring a sensing signal from the sensing electrode blocks 2 in each column, a touch location coordinate may be determined.

Figure 2:
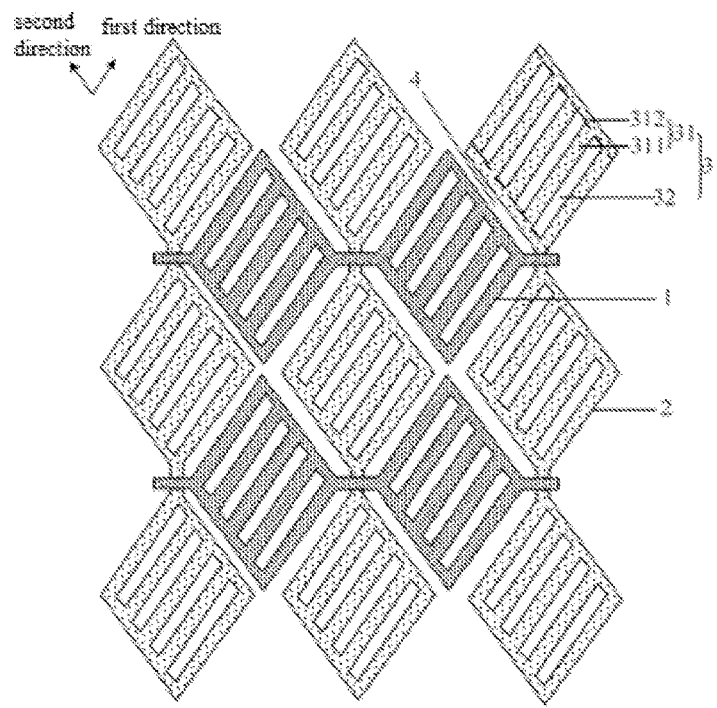
FIG. 2 is a first type of electrode pattern in a touch substrate provided by the present disclosure in at least one embodiment.
Figure 3:
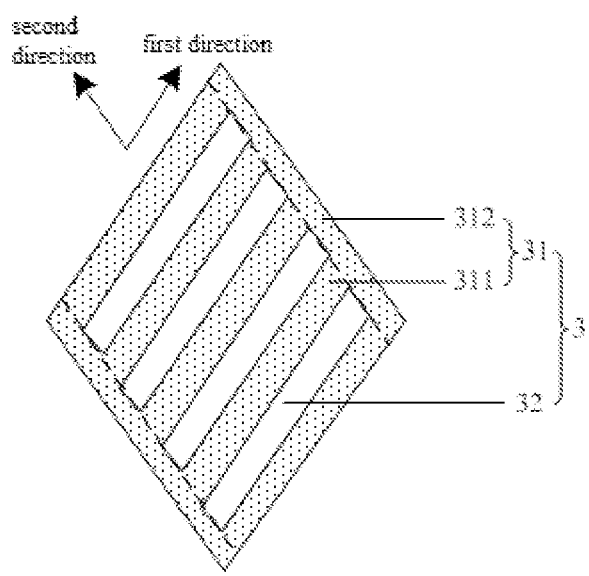
FIG. 3 is a schematic diagram of a first type of structure of a single electrode in the touch substrate provided by the present disclosure in at least one embodiment.
Figure 4:
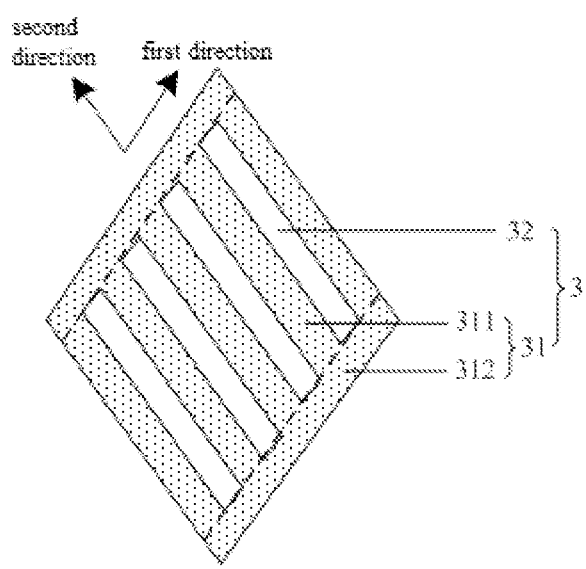
FIG. 4 is a schematic diagram of a second type of structure of the single electrode in the touch substrate provided by the present disclosure in at least one embodiment.

As shown in FIG. 2 to FIG. 4, the present disclosure provides a touch substrate in at least one embodiment. Electrode patterns are arranged in the touch substrate. The electrode patterns include a plurality of electrodes 3, and at least one of the electrodes 3 has a hollowed-out structure.

In the above-mentioned electrode patterns, at least one electrode 3 has the hollowed-out structure, regions to which the hollowed-out portions of the electrode correspond are not covered by a transparent conducting material, therefore the regions do not reflect light. That is, the reflecting region of one electrode includes non-reflecting regions. However, in the related art, a region to which one electrode corresponds is completely covered with a transparent conducting material capable of reflecting light, that is, the entire region to which one electrode corresponds reflects light. Compared with the related art, according to the present disclosure, the reflecting region of one electrode has non-reflecting regions, therefore a degree of visual difference caused by regions covered with the electrode patterns reflecting light and regions not covered with the electrode patterns not reflecting light is alleviated. Therefore, the user will not visually perceive apparent electrode patterns, thus improving the display effect and improving user's experience.

On the basis of the above technical solutions, optionally, each of the electrodes 3 of the touch screen may be configured to have a hollowed-out structure, such that the user's visual perception of apparent electrode patterns may be eliminated to a great extent, a uniformity and a consistency of electrode patterns on the touch screen are ensured, and a good touch effect is ensured.

According to the embodiments of the present disclosure, specific patterns of the electrodes having a hollowed-out structure may be designed based on practical requirements. Optionally, still referring to the FIG. 2 to FIG. 4, each of the electrodes 3 having the hollowed-out structure may include a non-hollowed-out portion 31 and a plurality of hollowed-out portions 32. The non-hollowed-out portion 31 includes a plurality of body portions 311.

In order to further alleviate the degree of visual difference caused by regions covered with the electrode patterns reflecting light and regions not covered with the electrode patterns not reflecting light, optionally, at least one hollowed-out portion 32 and at least a part of the body portions 311 in at least one electrode 3 having the hollowed-out structure may have a shape of extending in a first direction. Furthermore, optionally, the shape of the hollowed-out portions 32, the shape of the body portions 311 and the shape of a gap 4 between two adjacent electrodes in the first direction may be identical or approximately identical. Furthermore, the size of the hollowed-out portions 32, the size of the body portions 311 and the size of the gap 4 between two adjacent electrodes in the first direction may be identical or approximately identical.

Similarly, at least one of the hollowed-out portions 32 and at least a portion of the body portions 311 in at least one of the electrodes 3 having the hollowed-out structure may be arranged to extend in a second direction. Accordingly, the shape of hollowed-out portions 32, the shape of the body portions 311 and the shape of the gap 4 between two adjacent electrodes in the second direction may be identical or approximately identical, and the size of the hollowed-out portions 32, the size of the body portions 311 and the size of the gap 4 between two adjacent electrodes in the first direction may be identical or approximately identical.

Figure 5:
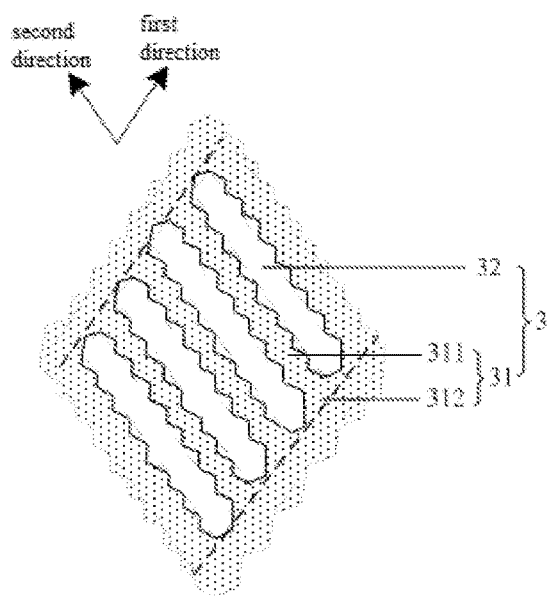
FIG. 5 is a schematic diagram of a third type of structure of the single electrode in the touch substrate provided by the present disclosure in at least one embodiment.

It should be noted that, the hollowed-out portions 32 and the body portions 311 being arranged to extend in the first direction refers to that shapes of the hollowed-out portions 32 and the body portions 311 extend a longer distance in the first direction than in other directions. For example, strip-shaped hollowed-out portions 32 and body portions 311 are arranged in the first direction, as shown in FIG. 2. Similarly, the shape of the hollowed-out portions 32 and the body portions 311 being arranged to extend in the second direction refers to that shapes of the hollowed-out portions 32 and the body portions 311 extend a longer distance in the second direction than in other directions. For example, strip-shaped hollowed-out portions 32 and body portions 311 are arranged in the second direction, as shown in FIG. 5.

For example, for the electrodes 3 having a rhombic shape as a whole, a gap between two adjacent rhombic electrodes 3 in the first direction or the second direction is strip-shaped. The shape of the hollowed-out portions 32, the shape of the body portions 311 and the shape of the gap 4 between two adjacent electrodes in the first direction being identical or approximately identical refers to that profiles of the shapes of the above three components are identical or approximately identical. For example, they all have a strip-shaped profile. It should be noted that, the shape of the hollowed-out portions 32 and the extending direction or arranging direction of the strip-shaped profile of the body portions 311 may be different from the extending direction or arranging direction of the strip-shaped profile of the gap 4 between two adjacent electrodes in the first direction. Furthermore, the widths and the lengths of the hollowed-out portions 32 and the body portion 311 are identical or approximately identical to the width and the length of the strip-shaped gap. In this way, a distribution of regions covered with electrode patterns and regions not covered with electrode patterns in the whole touch substrate tends to be uniform, which further decreases the degree of visual difference caused by regions covered with electrode patterns reflecting light and regions not covered with electrode patterns not reflecting light.

In addition, uniformly arranging the plurality of hollowed-out portions 32 and the plurality of body portions 311 in the electrode 3 having the hollowed-out structure may also further alleviate the degree of visual difference caused by regions covered with electrode patterns reflecting light and regions not covered with electrode patterns not reflecting light.

As shown in FIG. 3 and FIG. 4, in order to ensure that electrodes 3 having the hollowed-out structure have a good conductivity, optionally, the non-hollowed-out portion 31 further includes a connecting portion 312 connecting the plurality of body portions 311 of the non-hollowed-out portion 31. The existence of the connecting portion 312 makes the body portions 311 electrically connected to each other, thus realizing the connection of the entire non-hollowed-out portion 31. Optionally, the plurality of body portions 311 and the plurality of hollowed-out portions 32 of the electrode 3 having the hollowed-out structure may be arranged by turns, such that the reflecting regions and the non-reflecting regions in one electrode appear by turns, thus further alleviating the degree of visual difference caused by regions covered with electrode patterns reflecting light and regions not covered with electrode patterns not reflecting light.

Still referring to FIG. 3 and FIG. 4, one electrode 3 having the hollowed-out structure may have two connecting portions 312, which are located at opposite ends of the body portion 311. Each of the connecting portions 312 and the plurality of body portions 311 of the electrode 3 form a comb structure as a whole, with the connecting portion 312 as the comb handle of the comb structure, and the plurality of body portions 311 as the comb teeth of the comb structure. On the basis of the above structure, exemplarily, in the event that the shape of the gap 4 between two adjacent electrodes is strip-shaped, the shape of the body portions 311 and the hollowed-out portions 32 of the electrode 3 may be strip-shaped, one end of each of the body portions 311 is connected to one of the connecting portions 312 of the electrode 3, the other end of each of the body portions 311 is connected to the other connecting portion 312 of the electrode 3, thus forming a comb structure.

Regarding the practical design of the electrode 3, the electrodes 3 and even the body portions 311 and the connecting portions 312 of the electrodes 3 having the hollowed-out structure are not necessarily of a regular shape, such as a regular quadrilateral shape, a strip shape. Sides of electrode 3, sides of the body portions 311 and the connecting portions 312 of the electrode 3 having the hollowed-out structure may be straight, wavy, zigzag etc., as long as it is ensured that the shape and size of the hollowed-out portions 32 are identical or approximately identical to the shape and size of the gap 4 between two adjacent electrodes, the degree of visual difference caused by regions covered with the electrode patterns reflecting light and regions not covered with the electrode patterns not reflecting light may be alleviated. Exemplarily, as shown in FIG. 5, sides of the electrodes 3 having the hollowed-out structure, sides of the body portions 311 and sides of the connecting portions 312 of the electrodes 3 having the hollowed-out structure are zigzag. In this design, sides of the hollowed-out portions 32 and sides of the gap 4 between two adjacent electrodes 3 are also zigzag, thus the shape of the hollowed-out portions 32 and the shape of the gap 4 between two adjacent electrodes are identical or approximately identical.

Still referring to FIG. 3 and FIG. 4, in this embodiment, the plurality of electrodes of the touch substrate may have a quadrangular structure. A set of opposite sides of the quadrangular structure extends in the first direction, and a remaining set of opposite sides of the quadrangular structure extends in the second direction. The body portions 311 and the hollowed-out portions 32 of the electrodes 3 having the hollowed-out structure all extend in the first direction (as shown in FIG. 3) or the second direction (as shown in FIG. 4), such that the body portions 311, the hollowed-out portions 32 and the gap between two adjacent electrodes are more uniformly distributed, thus alleviating the degree of visual difference caused by regions covered with electrode patterns reflecting light and regions not covered with electrode patterns not reflecting light.

It should be noted that, with respect to the shapes of the plurality of electrodes of the touch substrate, FIG. 3 and FIG. 4 show a case in which the electrodes have a rhombic structure, and in other embodiments of the present disclosure, the electrodes may also have a rectangular structure, a square structure, etc. In addition, under a premise of the electrode having a quadrangular structure as a whole, sides of the electrodes are not necessarily straight, and may also be of a shape of other types of line, such as wavy and zigzag.

On the basis of the structure of the above single electrode having the hollowed-out structure, the overall arrangement of the electrode patterns in the touch substrate may have numerous types. Usually, the plurality of electrodes of the touch substrate includes a plurality of driving electrode blocks 1 and a plurality of sensing electrode blocks 2, and the driving electrode blocks 1 and the sensing electrode blocks 2 are arranged by turns in the first direction and the second direction. The plurality of driving electrode blocks 1 is arranged in a plurality of rows, the driving electrode blocks 1 in each row are connected in concatenation to form a plurality of driving lines. The plurality of sensing electrode blocks 2 is arranged in a plurality of columns, sensing electrode blocks 2 in each column are connected in concatenation to form a plurality of sensing lines. At least one of the driving electrode blocks 1 has a hollowed-out structure and at least one of the sensing electrode blocks 2 has a hollowed-out structure to eliminate the user's visual perception of apparent electrode patterns. Furthermore, all driving electrode blocks 1 and all sensing electrode blocks 2 may be provided as having a hollowed-out structure to eliminate user's visual perception of electrode patterns to a great extent.

Exemplarily, as shown in FIG. 2, the body portions 311 and the hollowed-out portions 32 of the driving electrode blocks 1 having the hollowed-out structure extend in the first direction, and the body portions 311 and the hollowed-out portions 32 of the sensing electrode blocks 2 having the hollowed-out structure extend in the first direction.

Figure 6:
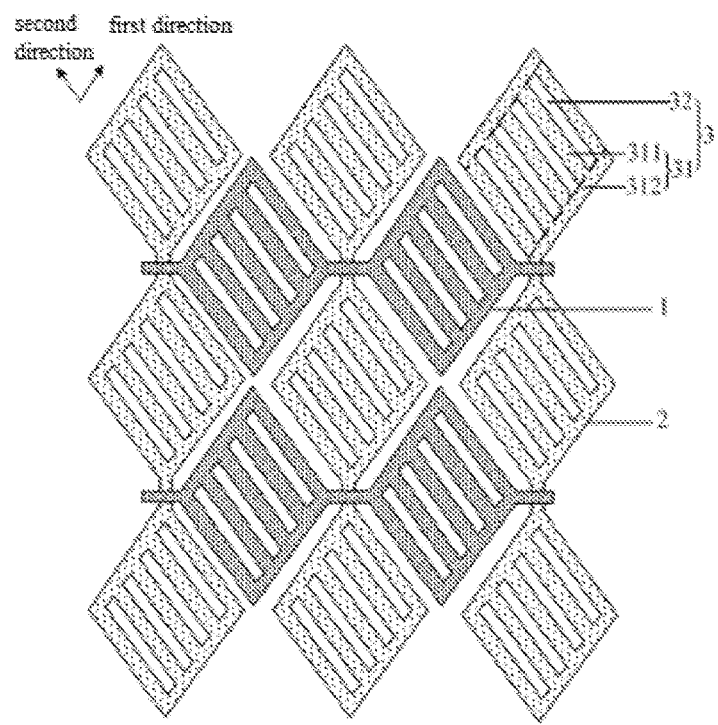
FIG. 6 is a second type of electrode pattern in the touch substrate provided by the present disclosure in at least one embodiment.

Exemplarily, as shown in FIG. 6, the body portions 311 and the hollowed-out portions 32 of the driving electrode blocks 1 having the hollowed-out structure extend in the second direction, and the body portions 311 and the hollowed-out portions 32 of the sensing electrode blocks 2 having the hollowed-out structure extend in the second direction.

Figure 7:
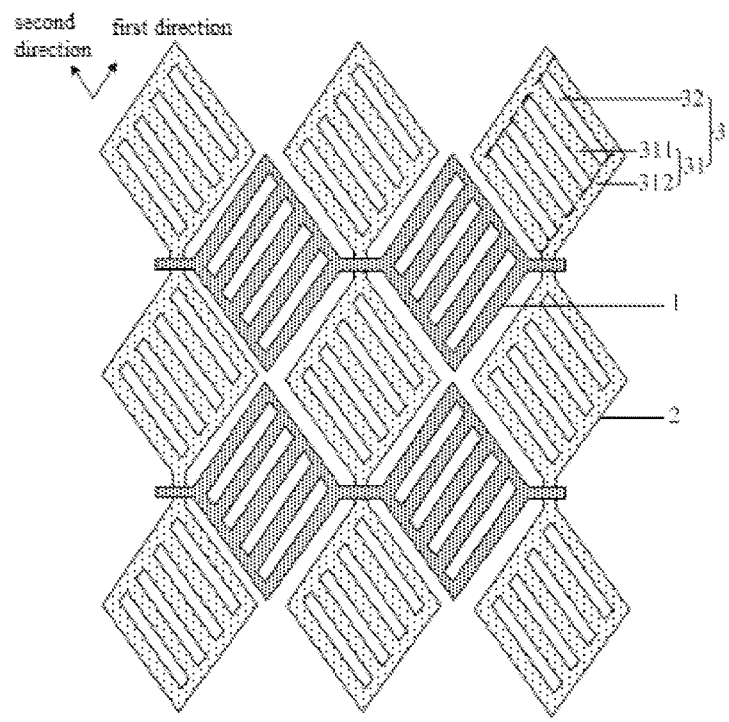
FIG. 7 is a third type of electrode pattern in the touch substrate provided by the present disclosure in at least one embodiment.

Exemplarily, as shown in FIG. 7, the body portions 311 and the hollowed-out portions 32 of the driving electrode blocks 1 having the hollowed-out structure extend in the first direction, and the body portions 311 and the hollowed-out portions 32 of the sensing electrode blocks 2 having the hollowed-out structure extend in the second direction.

Figure 8:
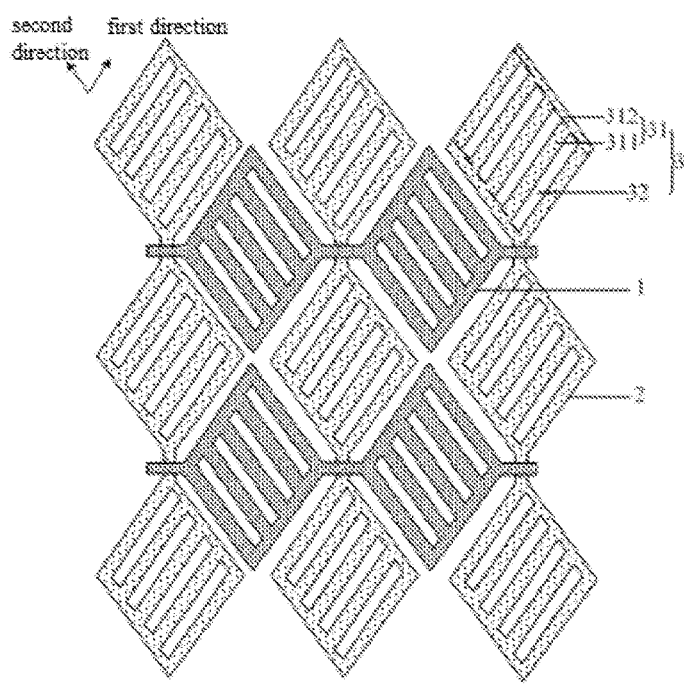
FIG. 8 is a fourth type of electrode pattern in the touch substrate provided by the present disclosure in at least one embodiment.

Exemplarily, as shown in FIG. 8, the body portions 311 and the hollowed-out portions 32 of the driving electrode blocks 1 having the hollowed-out structure extend in the second direction, the body portions 311 and the hollowed-out portions 32 of the sensing electrode blocks 2 having the hollowed-out structure extend in the first direction.

In addition, in the event that the plurality of driving electrode blocks 1 each has a hollowed-out structure, body portions 311 and hollowed-out portions 32 of a part of the driving electrode blocks 1 having the hollowed-out structure may be arranged to extend in the first direction, and the body portions 311 and the hollowed-out portions 32 of the remaining driving electrode blocks 1 having the hollowed-out structure may be arranged to extend in the second direction.

In the event that a plurality of sensing electrode blocks 2 each has a hollowed-out structure, body portions 311 and hollowed-out portions 32 of a part of the sensing electrode blocks 2 having the hollowed-out structure may be arranged to extend in the first direction, and body portions 311 and hollowed-out portions 32 of remaining sensing electrode blocks 2 having the hollowed-out structure may be arranged to extend in the second direction.

In the above electrodes 3 having the hollowed-out structure, optionally, an area of the body portion 311 and an area of the hollowed-out portion 32 may be identical, thus further eliminating the user's visual perception of apparent electrode patterns.

It should be noted that, the present disclosure introduces in at least one embodiment a solution in which the hollowed-out portions 32 of the electrodes 3 having the hollowed-out structure are strip-shaped, but in the touch substrate provided by the embodiment, the shape of the hollowed-out portions 32 of the electrodes 3 having the hollowed-out structure may also be of other shapes, such as a circular shape, an elliptic shape, a square shape or a rhombic shape.

Embodiments of the present disclosure further provide a touch display device, including the touch substrate provided by the present disclosure in at least one embodiment. Since the touch substrate provided by the present disclosure in at least one embodiment decreases the degree of visual difference caused by regions covered with the electrode patterns reflecting light and regions not covered with the electrode patterns not reflecting light, such that the user will not visually perceive apparent electrode patterns. Therefore, the touch display device including the touch substrate has a good display effect, and the user's experience is good.

It should be noted that, the touch display device provided by the present disclosure in at least one embodiment may be any products or components having a display function, such as a liquid crystal panel, an electronic paper, an organic light-emitting diode (OLED) panel, a mobile phone, a tablet PC, a TV, a display, a notebook computer, a digital photo frame, and a navigator.

The above are merely some specific embodiments of the present disclosure and shall not be used to limit the scope of the present disclosure. A person skilled in the art may readily envisage modifications and replacements without departing from the scope disclosed by the present disclosure, and these modifications and replacements shall also fall within the scope of the present disclosure. The scope of the present disclosure should be limited by the attached claims.

What is claimed is:

1. A touch substrate, comprising a plurality of electrodes, at least one of the plurality of electrodes having a hollowed-out structure,
   wherein each of the electrodes having the hollowed-out structure comprises a non-hollowed-out portion and a plurality of hollowed-out portions, the non-hollowed-out portion comprises a plurality of body portions, and at least one of the plurality of hollowed-out portions and at least one of the plurality of body portions of at least one of the electrodes having the hollowed-out structure extend in a first direction,
   wherein a shape of the hollowed-out portion, a shape of the body portion, and a shape of a gap between two adjacent electrodes in the first direction are identical or approximately identical, and
   wherein a size of the hollowed-out portions, a size of the body portion, and a size of the gap between two adjacent electrodes in the first direction are identical or approximately identical.

2. The touch substrate according to claim 1, wherein at least one of the plurality of hollowed-out portions and at least one of the plurality of body portions of at least one of the electrodes having the hollowed-out structure extend in a second direction.

3. The touch substrate according to claim 1, wherein
   at least two of the plurality of the electrodes of the touch substrate have a quadrangular structure, and a set of opposite sides of the quadrangular structure extends in the first direction, a remaining set of opposite sides of the quadrangular structure extends in the second direction, and
   in at least one of the electrodes having the hollowed-out structure, the plurality of hollowed-out portions and the plurality of body portions extend in the first direction or in the second direction.

4. The touch substrate according to claim 3, wherein at least two of the plurality of electrodes of the touch substrate have a rhombic structure, a rectangular structure or a square structure.

5. The touch substrate according to claim 1, wherein the non-hollowed-out portion further comprises a connecting portion connecting a part of the plurality of body portions.

6. The touch substrate according to claim 5, wherein at least one of the electrodes having the hollowed-out structure comprises two connecting portions, the two connecting portions are located at opposite ends of the plurality of body portions, and the plurality of body portions and each of the connecting portions form a comb structure.

7. The touch substrate according to claim 5, wherein in at least one of the electrodes having the hollowed-out structure, a part of the body portions and a part of the hollowed-out portions are arranged by turns.

8. The touch substrate according to claim 5, wherein sides of the plurality of electrodes of the touch substrate, sides of the plurality of body portions and sides of the connecting portion are straight, wavy or zigzag.

9. The touch substrate according to claim 1, wherein the plurality of electrodes of the touch substrate comprises driving electrode blocks and sensing electrode blocks, the driving electrode blocks and the sensing electrode blocks are arranged by turns in the first direction and the second direction, at least one of the driving electrode blocks has a hollowed-out structure, and at least one of the sensing electrode blocks has a hollowed-out structure.

10. The touch substrate according to claim 9, wherein each of the driving electrode blocks and each of the sensing electrode blocks have the hollowed-out structure, a hollowed-out portion and a body portion of each of the driving electrode blocks extend in the first direction, and a hollowed-out portion and a body portion of each of the sensing electrode blocks extend in the second direction; or
   the hollowed-out portion and the body portion of each of the driving electrode blocks extend in the second direction, and the hollowed-out portion and the body portion of each of the sensing electrode blocks extend in the first direction.

11. The touch substrate according to claim 9, wherein each of the driving electrode blocks and each of the sensing electrode blocks have the hollowed-out structure, a hollowed-out portion and a body portion of each of the driving electrode blocks and a hollowed-out portion and a body portion of each of the sensing electrode blocks extend in the first direction; or
   each of the driving electrode blocks and each of the sensing electrode blocks have the hollowed-out structure, and the hollowed-out portion and the body portion of each of the driving electrode blocks and the hollowed-out portion and the body portion of each of the sensing electrode blocks extend in the second direction.

12. A touch display device, comprising a touch substrate, the touch substrate comprising a plurality of electrodes, and at least one of the plurality of electrodes having a hollowed-out structure,
   wherein each of the plurality of electrodes having the hollowed-out structure comprises a non-hollowed-out portion and a plurality of hollowed-out portions, the non-hollowed-out portion comprises a plurality of body portions, and at least one of the plurality of hollowed-out portions and at least one of the plurality of body portions of at least one of the electrodes having the hollowed-out structure extend in a first direction, wherein a shape of the hollowed-out portion, a shape of the body portion, and a shape of a gap between two adjacent electrodes in the first direction are identical or approximately identical, and wherein a size of the hollowed-out portions, a size of the body portion, and a size of the gap between two adjacent electrodes in the first direction are identical or approximately identical.

13. The touch display device according to claim 12, wherein at least one of the plurality of hollowed-out portions and at least one of the plurality of body portions of at least one of the electrodes having the hollowed-out structure extend in a second direction.

14. The touch display device according to claim 12, wherein at least two of the plurality of the electrodes of the touch substrate have a quadrangular structure, and a set of opposite sides the quadrangular structure extends in the first direction, a remaining set of opposite sides of the quadrangular structure extends in the second direction, and in at least one of the electrodes having the hollowed-out structure, the plurality of hollowed-out portions and the plurality of body portions extend in the first direction or in the second direction.

\* \* \* \* \*